United States Patent
Azenkot et al.

(10) Patent No.: US 9,397,867 B1
(45) Date of Patent: Jul. 19, 2016

(54) CLOCK PHASE ADAPTATION FOR PRECURSOR ISI REDUCTION

(71) Applicant: Applied Micro Circuits Corporation, Sunnyvale, CA (US)

(72) Inventors: Yehuda Azenkot, San Jose, CA (US); Guy Jacque Fortier, Ottawa (CA)

(73) Assignee: Applied Micro Circuits Corporation, sunnyvale, CA (US)

( * ) Notice: Subject to any disclaimer, the term of this patent is extended or adjusted under 35 U.S.C. 154(b) by 0 days.

(21) Appl. No.: 14/619,952

(22) Filed: Feb. 11, 2015

(51) Int. Cl.
*H04L 25/03* (2006.01)
*H04L 7/00* (2006.01)

(52) U.S. Cl.
CPC ........ *H04L 25/03019* (2013.01); *H04L 7/0079* (2013.01); *H04L 2025/03592* (2013.01)

(58) Field of Classification Search
CPC ............... H04L 7/0062; H04L 2025/0349; H04L 25/0307; H04L 7/0004; H04L 7/0334; H04L 2027/004; H04L 2027/0067; H04L 25/03885; H04L 25/03019; H04L 7/0079; H04L 2025/03592
See application file for complete search history.

(56) References Cited

U.S. PATENT DOCUMENTS

| | | | |
|---|---|---|---|
| 7,167,516 B1 * | 1/2007 | He | H04L 7/0062 375/232 |
| 2005/0084046 A1 * | 4/2005 | Seo | H04L 25/03057 375/350 |
| 2014/0177699 A1 * | 6/2014 | Tan | H04L 25/03057 375/233 |
| 2014/0307826 A1 * | 10/2014 | He | H04L 7/0062 375/293 |
| 2015/0188693 A1 * | 7/2015 | Giaconi | H04L 7/0041 375/233 |

* cited by examiner

*Primary Examiner* — Vineeta Panwalkar

(57) ABSTRACT

Systems and methods of mitigating precursor ISIs for communication channels having time-variant precursor channel responses using digital circuit designs. A phase adaptation circuit is utilized in a receiver and configured to generate a phase control signal responsive to an input signal and based on the current precursor channel response. The phase control signal controls the phase shift of a recovered clock to a position where the precursor ISI at h(−1) is minimized. The phase control signal corresponds to a "feed-forward equalization (FFE) first tap weight" obtained via a digital least-mean-square (LMS) process.

18 Claims, 6 Drawing Sheets

CLOCK PHASE ADAPTATION FOR PRECURSOR ISI REDUCTION

TECHNICAL FIELD

The present disclosure relates generally to the field of communications, and, more specifically, to the field of signal processing in communications.

BACKGROUND

In telecommunication, high speed serial links (SerDes) transmit data over various physical media such as copper cables, backplanes, optical fibers, etc. High rate communication channels suffer many problems negatively affecting the integrity of the signals. A primary problem is intersymbol interferences (ISI), defined as a form of distortion of a signal in which one symbol interferes with other symbols in a similar effect as noise, thus making the communication less reliable. ISIs are usually caused by multipath propagation or the inherent non-linear frequency response of a channel whereby causing successive symbols to "blur" together.

The presence of ISIs in the system introduces errors in the decision device at the receiver output. Therefore, in the design of the transmitting and receiving filters, the objective is to minimize the effects of ISIs, and thereby deliver the digital data to its destination with the smallest error rate possible. Some receivers mitigate the effects of ISIs using one or more equalizers, typically feed-forward equalizers (FFEs) and decision-feedback equalizers (DFEs). FFEs can mitigate precursor ISIs and postcursor ISIs, while DFEs can only mitigate postcursor ISIs. Some of the precursor ISIs can be mitigated by a fixed continuous time linear equalizer (CTLE) which operates to compensate for the channel distortion such that the eye in the eye diagram is open enough for the clock and data recovery (CDR) logic to recover the clock and data.

Sometimes, a significant precursor ISI at $h(-1)$ still cannot be compensated which limits the resultant signal-noise ratio (SNR). A conventional approach to reduce the effect of the precursor ISI is to advance the phase of the clock until the precursor level of $h(-1)$ is negligible. However, advancing the clock phase is only performed once and so it is not adapted to any variation of the precursor channel response over time. Also, although the overall performance is improved, advancing the clock phase once causes some degradation of the received signal power of the main cursor and raises the level of the first tap weight of the decision in the DFE.

Generally speaking, conventional FFEs utilize multipliers for analog signals which make them difficult to implement. In contrast, DFEs are relatively easy to implement because they use multipliers for digital input.

SUMMARY OF THE INVENTION

The embodiments of the present disclosure provide systems and methods of mitigating precursor ISIs for communication channels having time-variant precursor channel responses using digital circuit designs. Embodiments of the present disclosure employ a phase adaptation circuit configured to generate a phase control signal responsive to an input signal and based on a current precursor channel response. The phase control signal is used to control the phase shift of a recovered clock to a position that the precursor ISI at $h(-1)$ (which is usually the most significant) is minimized. In some embodiments, the phase control signal corresponds to a feed-forward equalization (FFE) first tap weight ($C_1$) that is obtained via a digital least-mean-square (LMS) process. Thus, the precursor ISIs can be advantageously and effectively reduced using simple digital circuitry, rather than involving multiplication of analog signals as required in conventional FFEs.

According to one embodiment, an electronic circuit for signal processing includes a clock recovery circuit configured to generate a recovered clock signal based on an input signal, where the input signal is affected by precursor intersymbol interferences (ISIs). The electronic circuit further includes a precursor ISI reduction circuit coupled to the clock recovery circuit. The precursor ISI reduction circuit is configured to dynamically adapt the phase of the recovered clock signal based on the magnitude of a precursor channel response that varies with time.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
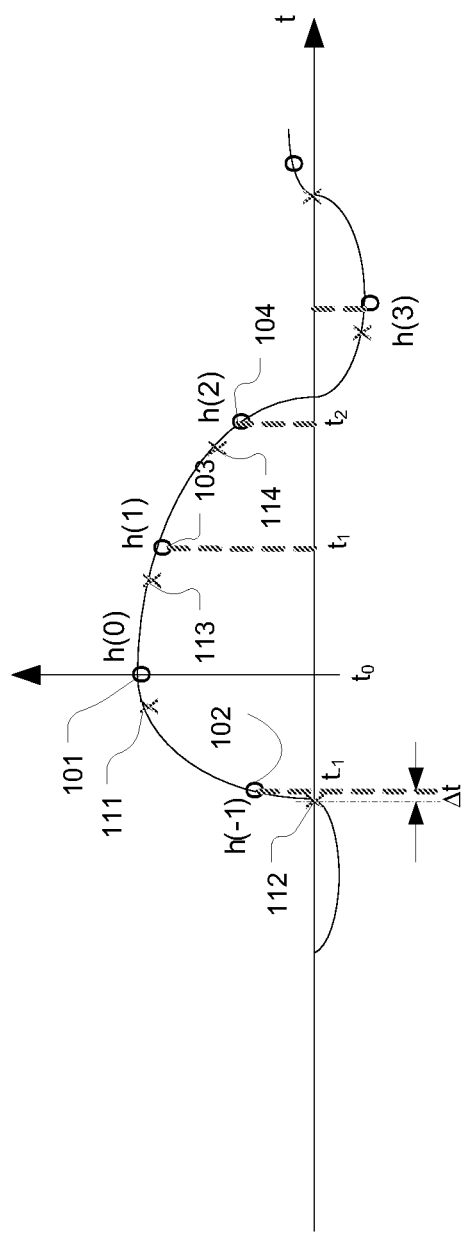
FIG. 1 illustrates a sample channel impulse-response exhibiting precursor ISIs that can be mitigated by clock-phase adaptation in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Clock-Phase Adaptation for Precursor ISI Reduction

Overall, embodiments of the present disclosure provide a receiver configured to attenuate precursor ISIs by dynamically adapting recovered clocks to the current channel response. The receiver includes a precursor ISI reduction circuit configured to advance the phase of a recovered clock to a position where the magnitude of the precursor ISI at h(−1) is minimized or to a minimal value. In some embodiments, the phase adaptation is controlled by a "feed-forward equalizer" (FFE) first tap weight that is generated by a digital FFE least-mean-square (LMS) adaptor.

FIG. 1 illustrates a sample channel impulse-response 100 exhibiting ISIs that can be mitigated by clock-phase adaptation in accordance with an embodiment of the present disclosure. In this example, the impulse-response 100 is obtained responsive to a pulse transmitted through a channel. As shown, the impulse response 100 extends over more than 1 symbol period due to precursor and postcursor ISIs.

The circles (e.g., 101-104) on the curve mark the magnitudes of impulse responses sampled according to a recovered clock without dynamic adaptation. The symbol h(0) 101 at time to represents the level of the current symbol (or the main cursor); h(−1) 102 represents the level of the precursor ISI at time $t_{-1}$; and h(1) and h(2) represent the levels of the post cursor ISIs at times $t_1$ and $t_2$, respectively.

As shown, if the sampling clock is advanced, the predominant precursor ISI at h(−1) 102 can reduce to zero or otherwise become a negligible level. Particularly, at $t=(t_{-1}-\Delta t)$, h(−1) 112 becomes zero. Accordingly, effective removal of the predominant precursor ISI can be achieved by advancing the clock phase by $\Delta t$. As shown, the crosses (e.g., 111-114) on the curve mark the magnitudes of the impulse responses sampled according to an adapted clock. Because the impulse-response 100 varies over time (e.g., due to temperature and/or voltage changes in the channel), the embodiments of the present disclosure provide a digital approach to adapt the clock phase dynamically to the current impulse response, as described in greater detail below. More specifically, the clock advancement $\Delta t$ is automatically adjusted to the current magnitude of precursor ISI at h(−1) of the channel.

Figure 2:
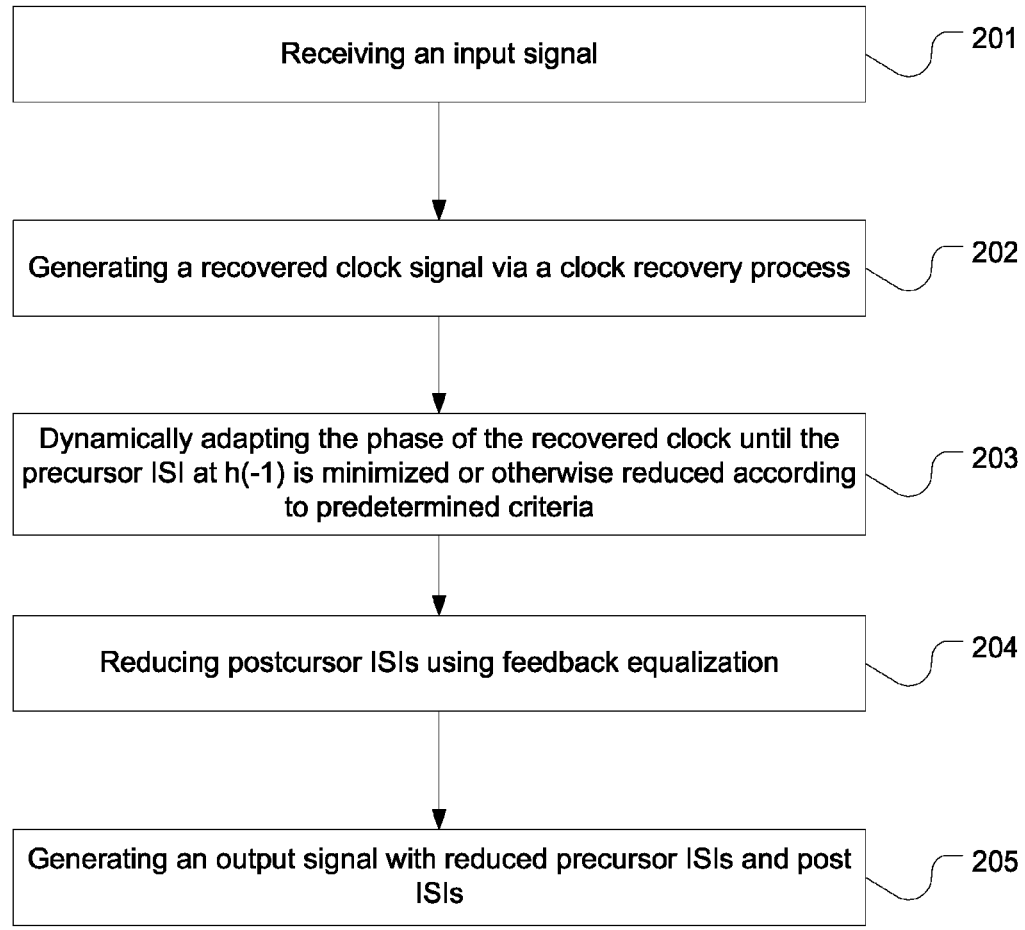
FIG. 2 is a flow chart depicting an exemplary process of clock and data recovery at a receiver responsive to an input signal in accordance with an embodiment of the present disclosure.

FIG. 2 is a flow chart depicting an exemplary process 200 of clock and data recovery responsive to an input signal in accordance with an embodiment of the present disclosure. For example, process 200 is performed by a receiver coupled to a high speed serial link. At 201, an input signal is received. At 202, a clock recovery process is performed to generate a recovered clock signal. At 203, the phase of the recovered clock is dynamically adjusted based on the current precursor channel response. More particularly, a phase shift is determined to cause the precursor ISI at h(−1) imposed on the current symbol to become practically negligible. As a result, the precursor ISI can be advantageously and consistently attenuated despite the variation of precursor channel response over time. At 204, the postcursor ISIs are removed, e.g., through a decision-feedback equalization process. At 205, an output signal with mitigated precursor and postcursor ISIs is provided to a "using logic" coupled to the receiver.

Figure 3:
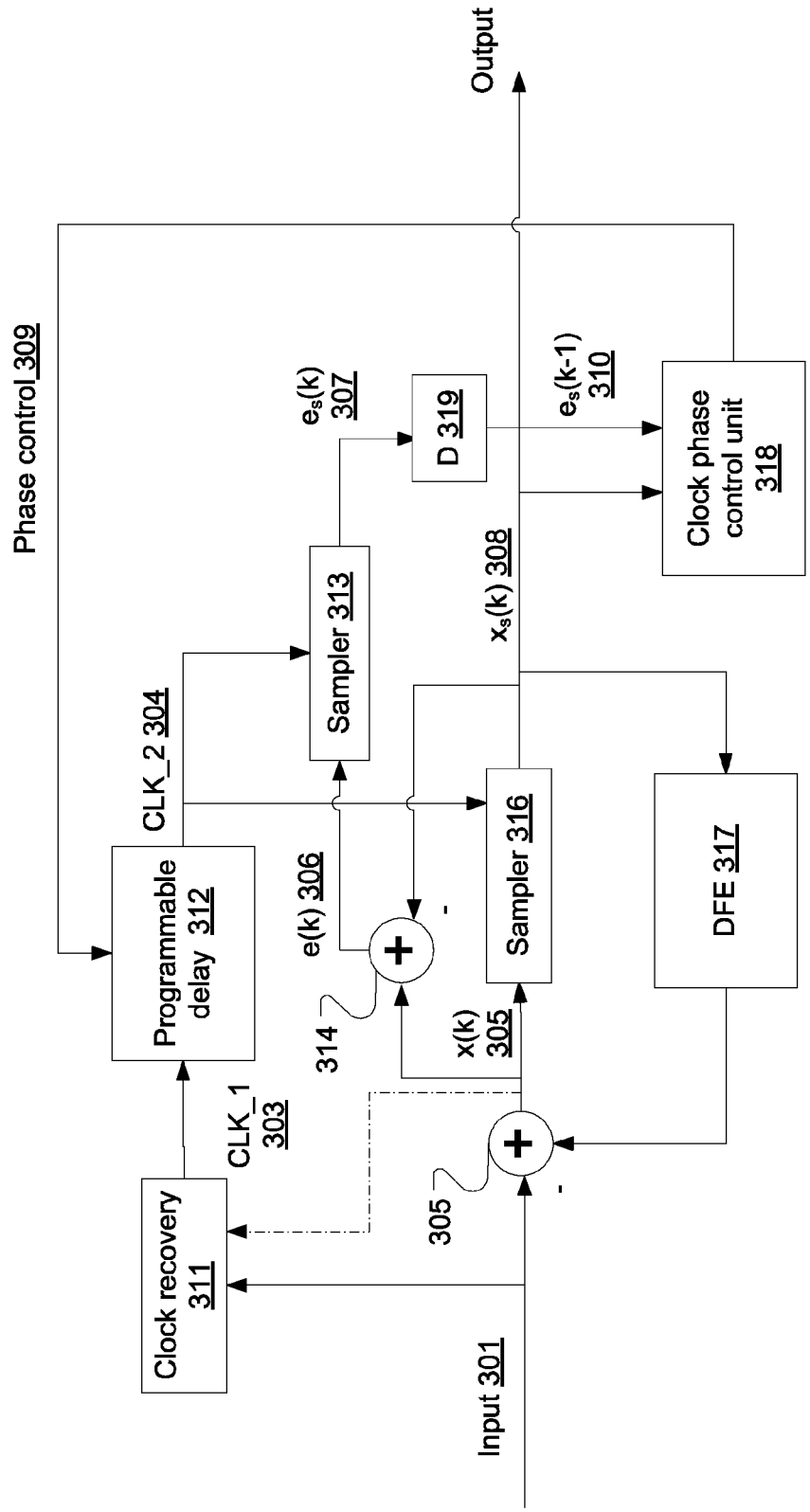
FIG. 3 is a diagram illustrating an exemplary receiver capable of attenuating precursor ISIs by adapting the clock phase to the time-variant precursor channel response in accordance with an embodiment of the present disclosure.

FIG. 3 is a diagram illustrating the configuration of an exemplary receiver 300 capable of attenuating precursor ISIs by adapting the clock phase to the time-variant channel response in accordance with an embodiment of the present disclosure. The receiver 300 includes clock recover circuitry 311 coupled to a programmable delay 312, samplers 313 and 316, a DFE 317 and a clock phase control unit 318. The clock phase control unit 318 is configured to produce a phase control signal 309 to control the programmable delay 312 to shift the clock phase of the recovered cock CLK_1 303. The programmable delay 312 outputs the adapted CLK_2 304. In some embodiments, the phase control signal 309 is an FFE first tap weight $C_1$ that is adapted to the current precursor channel response, as described in greater detail with reference to FIGS. 4-6.

One conventional approach to mitigate the precursor ISI is via an FFE that implements a least-mean-square (LMS) process, where tap weights are used to modify the voltages (taps) of the precursor ISIs. The LMS process to adapt the first precursor tap is typically represented as:

$$C_1(k+1)=C_1(k)+\mu \cdot e(k) \cdot x(k+1) \qquad \text{Equation 1}$$

where: $C_1(k)$ represents the weight of tap 1 (or the first tap weight) at time k; represents the adaptation coefficient; e(k) represents the sampling error at time k; and x(k+1) represents the first tap of FFE at time k.

According to the present disclosure, the first tap weight $C_1$ is dynamically adjusted to the current channel response through an LMS adaptation process, and the adapted first tap weight $C_1$ is used to dynamically adjust the clock phase. Further, the implementation of the FFE can be advantageously simplified by using the digital values of the error and the data signals, e.g., the signs of the signals. In addition, the delayed versions of both the error and the data signals can be used as well.

Thus, according to embodiments of the present disclosure, the LMS adaptation is modified to:

$$C_1(k+1) = C_1(k) + \mu \cdot e_s(k-1) \cdot x_s(k) \qquad \text{Equation 2}$$

Equation 2 shows that the weight of FFE tap 1 $C_1$ is fully adapted when the error portion at tap 1 is minimized and, in effect, the precursor ISI $h(-1)$ is minimized. Therefore, the adapted first tap weight $C_1$ is used to control the clock phase to the position where the precursor ISI at $h(-1)$ is minimized.

During operation of the receiver 300 shown in FIG. 3, responsive to the input signal 301 (e.g., corresponding to a data stream transmitted without a clock signal), the clock recovery circuitry 311 generates a recovered clock CLK_1 303 by phase-aligning a locally generated clock signal to the incoming data. However, in some other embodiments, the clock recovery circuitry 311 generates a recovered clock CLK_1 303 in response to the equalized signal x(k) 305, as shown by the dashed arrow line. In one embodiment, the clock recovery circuitry 311 includes a Bang-Bang phase-locked loop (PLL) that uses Alexander phase detectors to produce up and down signals depending on the signs of the phase error.

The DFE 317 is coupled between the input and output of the data sampler 316. In conjunction with the subtractor 315, the DFE 317 operates to reduce or minimize the effects of postcursor ISIs imposed on the current symbol (at time k) and provides the equalized data signal x(k) 305. The equalized signal 305 is provided to the data sampler 316 to generate samples of the equalized data signal $x_s(k)$ 308.

The subtractor 314 subtracts the sampled data signal $x_s(k)$ 308 from the equalized data signal x(k) 305 to produce the error signal e(k) 306 of the current symbol. The error sampler 313 samples the error signal e(k) 306 and generates the estimated error $e_s(k)$ 307 which is fed to the delay circuitry 319 to produce the estimated error of the last symbol $e_s(k-1)$ 310. As such, the delayed signed error $e_s(k-1)$ 310 is obtained after delaying the error sampler 313 output $e_s(k)$ 307.

The approximation of the delayed signed FFE tap 1 signal $x_s(k)$ is available at the output of the data sampler 316 at time k+1. The clock phase control unit 318 receives $x_s(k)$ 308 and $e_s(k-1)$ 307 and generates the first tap weight $C_1(k+1)$ 309 as the phase control signal according to the LMS algorithm represented by Equation 2. Based on the magnitude of $C_1(k+1)$ 309, the programmable delay 312 adapts the phase of the recovered clock CLK_1 303 to generate the adapted clock CLK_2 304 which is provided to the samplers 316 and 313. In effect, the data sampler 316 samples the equalized data signal x(k) 305 according to the adapted clock CLK_2 304; and the sampler 313 samples the error signal e(k) 306 according to the adapted clock CLK_2 304. As a result, the precursor ISIs are effectively mitigated because the adapted clock ensures the mean squared error signal is minimized.

Referring back to FIG. 1, if the clock is advanced by Δt to minimize the precursor ISI at $h(-1)$, some of the postcursor ISIs may increase at the same time. For instance, the postcursor ISI at $h(1)$ increases from the level marked by circle 103 to the level marked by cross 113. Nonetheless, the increased postcursor ISIs can be effectively removed or attenuated by the DFE 317. Therefore, the output data signal 308 has both precursor and postcursor ISIs attenuated or removed.

Figure 4:
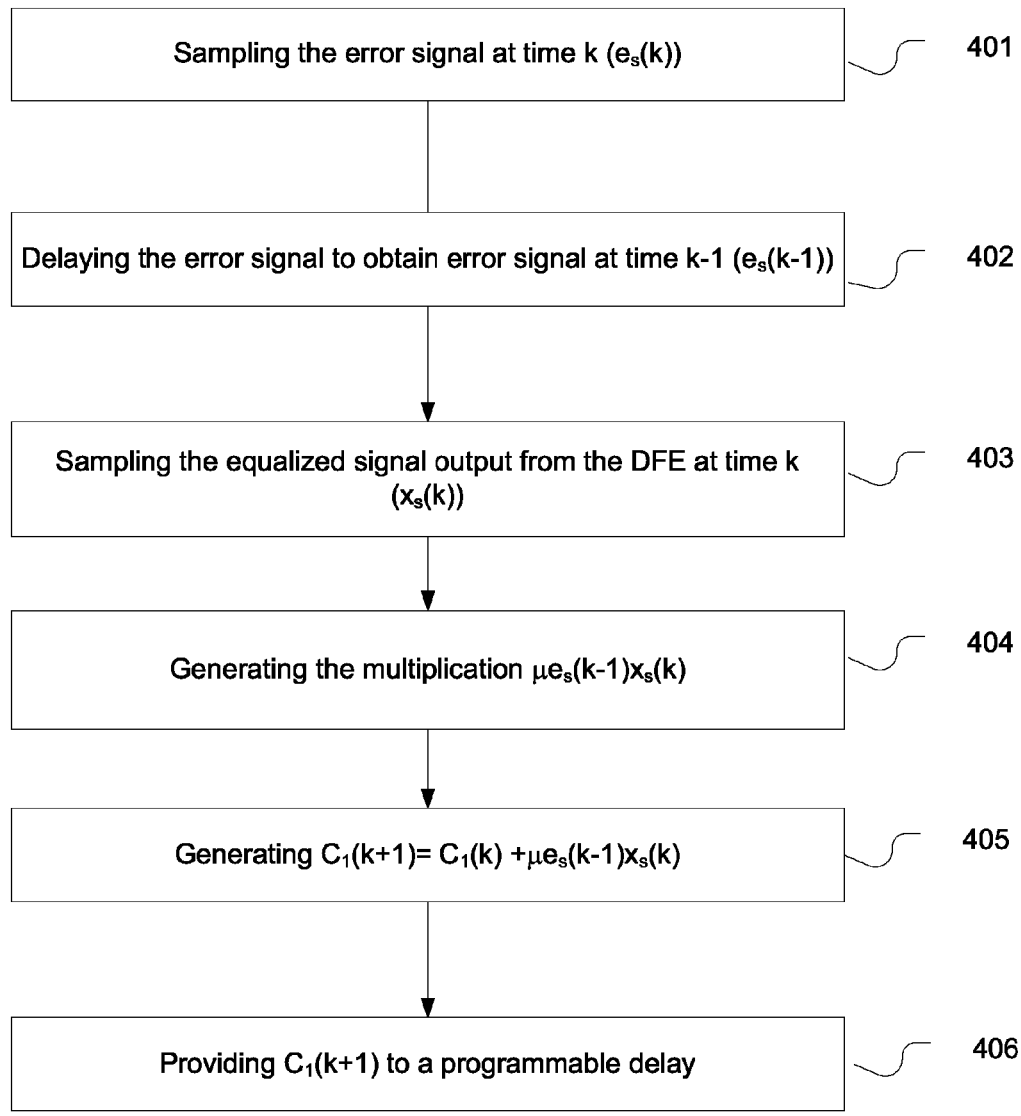
FIG. 4 depicts an exemplary digital FFE LMS process of generating a phase adaptation control signal for reducing precursor ISIs based on the current precursor channel response in accordance with an embodiment of the present disclosure.

FIG. 4 depicts an exemplary digital FFE LMS process 400 of adapting clock phase to reduce precursor ISIs based on the current channel response in accordance with an embodiment of the present disclosure. Process 400 corresponds to step 203 in FIG. 2. At 401, the error signal at time k e(k) is sampled and $e_s(k)$ is generated. At 402, the sampled error signal $e_s(k)$ is delayed by a clock period to obtain the delayed error signal $e_s(k-1)$. At 403, the equalized data signal (as provided by a DFE) is sampled at time k to generate $x_s(k)$. At 404, a multiplication is performed to obtain a signal representing the LMS error term as shown in Equation 3: $\rho \cdot e_s(k-1) \cdot x_s(k)$, which is added to the first tap weight obtained at time k ($C_1(k)$) to generate the adapted first tap weight at time k+1 ($C_1(k+1)$) at 405. At 406, $C_1(k+1)$ is provided to a programmable delay 406 to adjust the phase offset of the recovered clock signal. As a result, an adapted clock is produced. The foregoing process 400 is repeated for each clock cycle responsive to the input signal.

Figure 5:
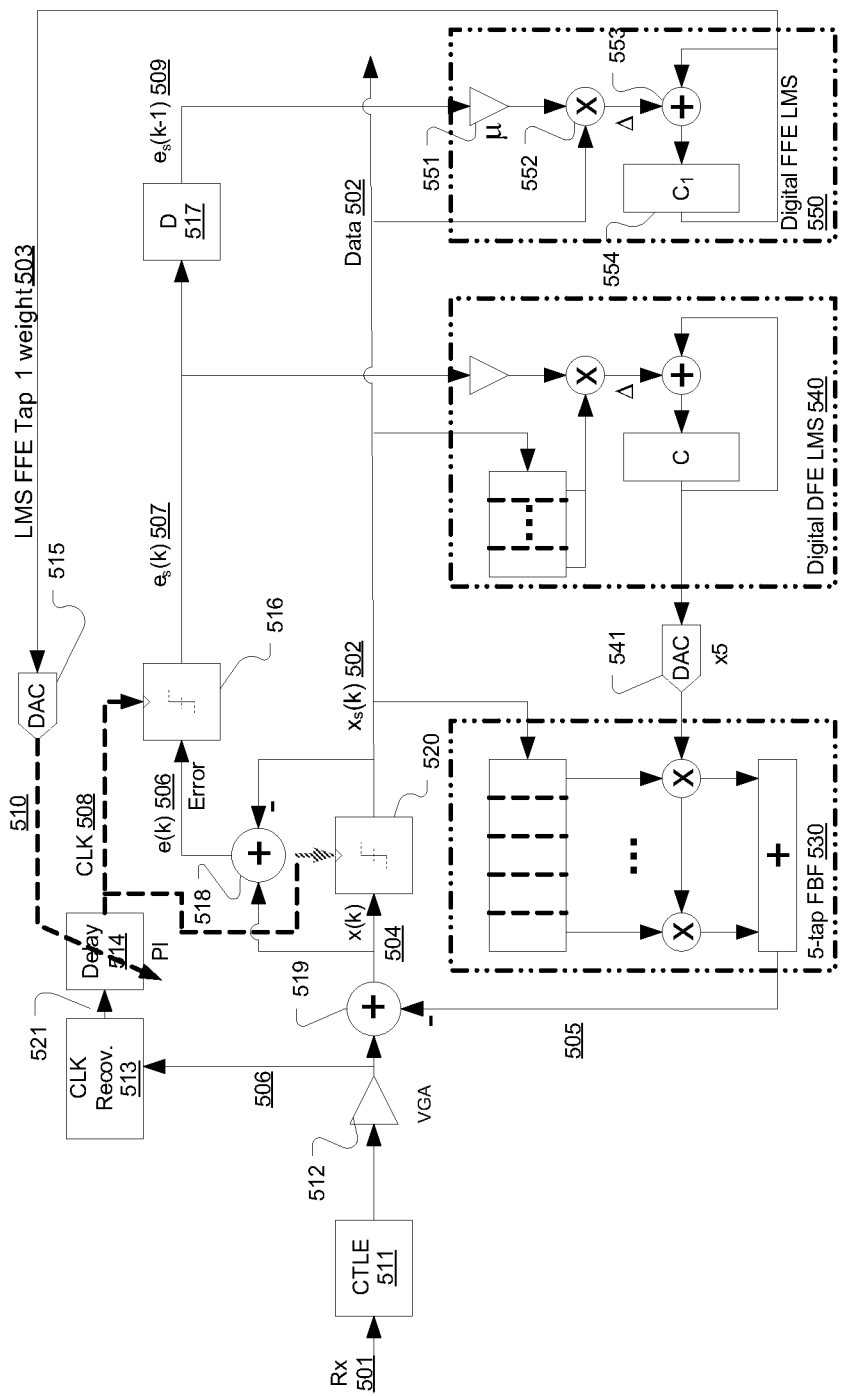
FIG. 5 illustrates a configuration of an exemplary receiver equipped to remove precursor ISIs by dynamically adapting the clock phase using a digital FFE LMS process in accordance with an embodiment of the present disclosure.

FIG. 5 illustrates a configuration of an exemplary receiver 500 equipped to remove precursor ISIs by adapting the clock phase using a digital FFE LMS process in accordance with an embodiment of the present disclosure. The clock-phase adaptation is performed by the phase control circuitry including the digital FFE LMS adaptor 550, a digital-analog converter 515 and a phase interpolator 514. The receiver 500 also includes clock recovery circuitry 513, a fixed continuous time linear equalizer (CTLE) 511, a variable gain amplifier (VGA) 512, a DFE including a 5-*tap* feedback filter (FBF) 530 and a digital DFE LMS adaptor 540, a data slicer 520, an error slicer 516, and subtractors 518 and 519. It will be appreciated that the receiver may include any other suitable component or function that is well known in the art.

During operation, a received signal Rx 501 is fed to the CTLE 511 and compensated with respect to the channel distortion so the eye in the diagram is open enough to enable the clock recovery circuitry 513 to recover the clock properly. In some other embodiments, the clock recovery circuitry 513 is configured to generate a recovered clock based on the equalized signal (e.g., x(k) 504). In one embodiment, the clock recovery circuit 513 is a Bang-Bang PLL that uses an Alexander phase detector to produce up and down signals depending on the signs of the phase error. The output of the CTLE 511 is amplified by the VGA 512. The amplified signal 506 is sent to the clock recovery circuitry 513 to generate a recovered clock 521.

The DFE includes an analog FBF 530 and a digital part 540 that implements the LMS method to acquire the tap weights of the DFE. The digital DEE LMS adaptor 540 receives the digital signal 502 $x_s(k)$ that is output from the data slicer 520 and also the error signal $e_s(k)$ 507 output from the data slicer 516 and then generates each of the tap weights for the five recently received samples according to an LMS process. The tap weights are converted to an analog form by the digital-analog converters 541. The 5-*tap* FBF 530 multiplies each of the five recently received samples with their analog weights and the products are summed to produce a feedback signal 505.

The subtractor 519 subtracts the feedback signal 505 from the amplified signal 506 and generates the equalized data signal x(k) 504. The equalized signal x(k) 504 is sampled into the digital data signal $x_s(k)$ 502 by the data slicer 520. As such, the DFE eliminates or at least mitigates the effect of postcursor ISIs on the current symbol imposed by the prior five symbols.

The subtractor 518 subtracts the digital data signal $x_s(k)$ 502 from the equalized data signal x(k) 504 to generate the error signal e(k) 506 which is sampled into the estimated error signal $e_s(k)$ 507 by the error slicer 516. The digital error signal $e_s(k)$ 507 is provided to a delay unit D 517 which outputs a delayed error signal $e_s(k-1)$ 509.

The digital FFE LMS adaptor 550 receives the digital data signal $x_s(k)$ 502 and the delayed error signal $e_s(k-1)$ 509 and operates to generate the LMS FFE first tap weight 503 according to Equation 2. The digital value of $C_1$ 503 is converted to an analog signal 510 by the digital-to-analog converter (DAC) 515. The analog signal 510 is sent to the phase interpolator 514 to adjust the clock phase of the recovered clock 521 in fine increments and thereby generates an adapted clock 508.

Specifically, the digital FFE LMS adaptor 550 includes an amplifier (or a multiplier, etc.) 551, a multiplier 552, an adder 553 and a register 554 storing the previous digital value of $C_1$ ($C_1(k)$). The amplifier 551 multiplies the delayed error signal $e_s(k-1)$ 509 by an adaptation coefficient and generates a signal representing $\mu e_s(k-1)$. At the multiplier 552, the digital data signal $x_s(k)$ 502 is multiplied with the output from the amplifier 552, yielding a signal representing $\mu \cdot e_s(k-1) \cdot x_s(k)$. The adder 553 adds $C_1(k)$ stored in the register 554 to $\rho \cdot e_s(k-1) \cdot x_s(k)$ and outputs the LMF FFE first tap weight 503, as represented in Equation 2.

The adapted clock signal 508 is provided to the data slicer 520 and error slicer 516 to shift the timing of the sampling to a position that causes reduced precursor ISIs relative to the main cursor. As a result, the output digital data signal $x_s(k)$ has attenuated precursor and postcursor ISIs.

Figure 6:
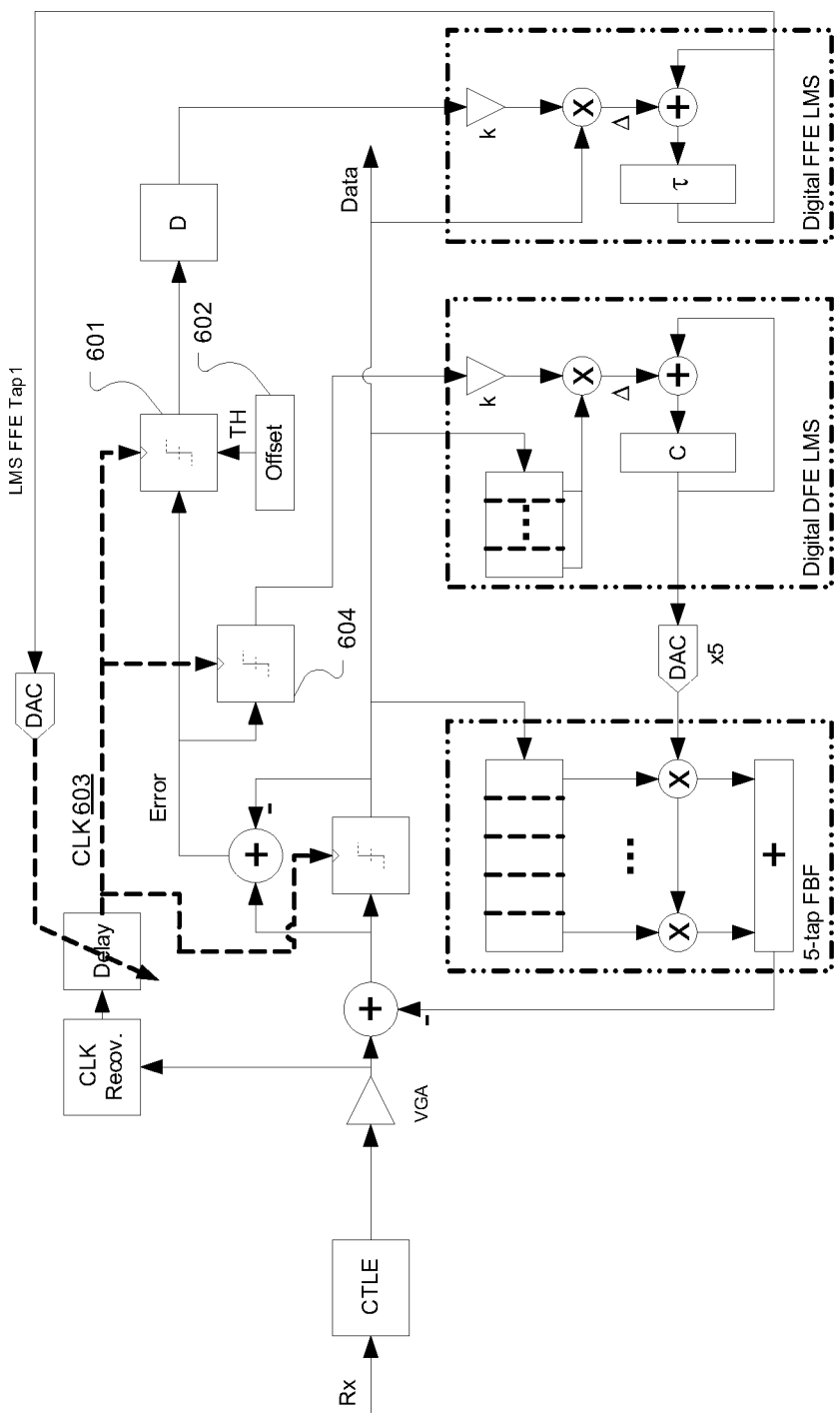
FIG. 6 illustrates a configuration of another exemplary receiver equipped to attenuate precursor ISIs by dynamically adapting the clock phase up to a threshold phase offset using a digital FFE LMS process in accordance with an embodiment of the present disclosure.

In some embodiments, the adapted timing phase advance can converge to a minimal value if it is based on the precursor at h(−1) that has some small value, rather than being zero. This can be achieved by adding a programmable threshold to the error slicer so the slicer error threshold is offset from the nominal value. In this case, the precursor ISI will not be reduced to a non-zero minimal value. FIG. 6 illustrates a configuration of another exemplary receiver 600 equipped to remove precursor ISIs by adapting the clock phase up to a threshold value using a digital FFE LMS process in accordance with an embodiment of the present disclosure. The receiver 600 has a similar configuration with the receiver 500 except that a dedicated error slicer 601 is used for clock-phase adaptation, while the other error slicer 604 is used for DFE adaptation. Both error slicers 601 and 603 sample the error signal e(k) according to the adapted clock 603. In addition, the error slicer 601 is coupled to a register 602 storing a programmable threshold.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. An electronic circuit for signal processing, said electronic circuit comprising:
    a clock recovery circuit configured to generate a recovered clock signal based on an input signal, wherein said input signal comprises precursor intersymbol interferences (ISIs); and
    a precursor ISI reduction circuit coupled to said clock recovery circuit and configured to dynamically adapt a phase of said recovered clock signal based on a current magnitude of a precursor channel response that varies with time, wherein said precursor ISI reduction circuit comprises:
    a programmable delay circuit coupled to said clock recovery circuit and configured to:
        dynamically advance a phase of said recovered clock signal responsive to an adaptation control signal; and
        generate an adapted clock signal; and
    a phase adaptation control circuit coupled to said programmable delay circuit and configured to generate said adaptation control signal.

2. The electronic circuit of claim 1, wherein said adaptation control signal corresponds to a feed-forward equalization (FFE) first tap weight obtained in accordance with a digital least-mean-square (LMS) adaptation process.

3. The electronic circuit of claim 2 further comprising:
    a decision-feedback equalizer (DFE) configured to generate an equalized signal responsive to said input signal;
    a first sampler coupled to said DFE and configured to generate samples of said equalized signal according to said adapted clock signal; and
    a second sampler coupled to said DFE and configured to generate samples of an error signal according to said adapted clock signal, wherein said error signal represents a difference between said equalized signal and said samples of said equalized signal.

4. The electronic circuit of claim 3, wherein: said FFE first tap weight of a current symbol is generated by adding a first tap weight of a last symbol to a product of a first tap of said last symbol and an error of a second-last symbol; said first tap of said last symbol is generated by said first sampler; and said error of said second-last symbol is generated by delaying an output of said second sampler.

5. The electronic circuit of claim 3, wherein said DFE comprises a feedback filter (FBF) and a digital LMS DFE.

6. The electronic circuit of claim 3, wherein: said phase adaptation control circuit is coupled to a third sampler; said third sampler is coupled to said DFE and configured to generate samples of said error signal according to said adapted clock signal; and said third sampler is configured to limit a phase adaptation of said recovered clock signal to a predetermined threshold.

7. The electronic circuit of claim 1, wherein said adapted clock signal causes a magnitude of a first channel response precursor to be reduced to a predetermined value.

8. A receiver comprising
    a clock recovery circuit configured to generate a recovered clock signal responsive to an input signal, wherein said input signal comprises precursor intersymbol interferences (ISIs);
    a decision-feedback equalizer (DFE) coupled to said clock recovery circuit and configured to generate an equalized signal responsive to said input signal; and
    a precursor ISI reduction circuit coupled to said clock recovery circuit and configured to:
        generate a feed-forward equalization (FFE) tap weight according to a digital least-mean-square (LMS) adaptation process;
        advance said recovered clock signal by a phase offset that is controlled by said FFE tap weight; and
        output an adapted clock signal.

9. The receiver of claim 8, wherein said FFE tap weight is a first tap weight.

10. The receiver of claim 8 further comprising:
    a first sampler coupled to said DFE and configured to generate samples of said equalized signal according to said adapted clocks signal; and
    a second sampler coupled to said DFE and configured to generate samples of an error signal according to said adapted clock signal, wherein said error signal represents a difference between said equalized signal and said samples of said equalized signal.

11. The receiver of claim 10, wherein said precursor ISI reduction circuit is configured to:

generate a multiplication of a first tap of a last symbol and an estimated error of a second-last symbol; and add a first tap weight of a last symbol to said multiplication to obtain said first tap weight.

12. The receiver of claim 11, wherein said first tap of said last symbol is a sample of said equalized signal, and wherein said estimated error of said second-last symbol is generated by delaying a sample of said error signal.

13. The receiver of claim 10, wherein said precursor ISI reduction circuit is further configured to limit said phase offset to a predetermined threshold.

14. The receiver of claim 8 further comprising:

a variable gain amplifier (VGA) coupled to said DFE; and a continuous time linear equalizer (CTLE) coupled to said VGA.

15. A method of processing signals transmitted via serial links, said method comprising:

generating a recovered clock signal responsive to an input signal via a clock recovery process, wherein said input signal comprises precursor intersymbol interferences (ISIs);

dynamically adapting a phase of said recovered clock signal based on a current magnitude of a precursor channel response that varies with time, wherein said dynamically adapting comprises:

generating a feed-forward equalization (FFE) first tap weight of a current symbol in accordance with a least-mean-square (LMS) adaptation process; and advancing said recovered clock signal based on said FFE first tap weight of said current symbol; and outputting an adapted clock signal.

16. The method of claim 15, wherein said dynamically adapting further comprises:

generating an equalized signal of said input signal;

generating samples of said equalized signal according to said adapted clock signal; and generating samples of an error signal according to said adapted clocks signal, wherein said error signal represents a difference between said equalized signal and said samples of said equalized signal.

17. The method of claim 15, wherein said generating said FFE first tap weight of said current symbol comprises adding a first tap weight of a last symbol to a multiplication of a first tap of a last symbol and an estimated error of a second-last symbol.

18. The method of claim 15 further comprising limiting phase adaptation of said recovered clock signal to a predetermined threshold.

* * * * *